(12) United States Patent
Yuki

(10) Patent No.: US 8,886,961 B2
(45) Date of Patent: *Nov. 11, 2014

(54) APPLICATION INSTALLING METHOD

(71) Applicant: Canon Kabushiki Kaisha, Tokyo (JP)

(72) Inventor: Naoto Yuki, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/902,140

(22) Filed: May 24, 2013

(65) Prior Publication Data

US 2013/0262878 A1  Oct. 3, 2013

Related U.S. Application Data

(62) Division of application No. 13/078,561, filed on Apr. 1, 2011, now Pat. No. 8,473,755.

(30) Foreign Application Priority Data

May 6, 2010   (JP) ................. 2010-106259

(51) Int. Cl.
G06F 11/30 (2006.01)
G06F 21/10 (2013.01)
G06F 21/62 (2013.01)

(52) U.S. Cl.
CPC ...... *G06F 21/105* (2013.01); *G06F 2221/2113* (2013.01); *G06F 21/6209* (2013.01)
USPC ........................................ 713/191

(58) Field of Classification Search
USPC .......... 713/166, 174, 175, 191, 193; 380/281, 380/284; 726/26
See application file for complete search history.

(56) References Cited

U.S. PATENT DOCUMENTS

| | | | |
|---|---|---|---|
| 6,647,495 B1 | 11/2003 | Takeuchi |
| 7,523,303 B2 | 4/2009 | Nakae |
| 8,010,961 B1 | 8/2011 | Cook |
| 8,196,131 B1 | 6/2012 | von Behren |
| 2006/0269053 A1 | 11/2006 | Miyazawa |
| 2008/0065550 A1 | 3/2008 | Zhu |

FOREIGN PATENT DOCUMENTS

| | | |
|---|---|---|
| JP | 10-301773 | 11/1998 |
| JP | 2000-48076 | 2/2000 |
| JP | 2000-196585 | 7/2000 |
| JP | 2003-187016 | 7/2003 |
| JP | 2006-339847 | 12/2006 |

OTHER PUBLICATIONS

Japanese Office Action dated Jan. 14, 2014 issued during prosecution of related Japanese application No. 2010-106259.

*Primary Examiner* — Beemnet Dada
(74) *Attorney, Agent, or Firm* — Fitzpatrick, Cella, Harper & Scinto

(57) ABSTRACT

An application installing method according to the present invention in which an application file includes at least two application encrypting data in which the executable files are respectively encrypted using different encryption algorithms, and a license file includes at least two license encryption data in which application decryption keys for decrypting the application encryption data are encrypted using respectively different encryption algorithms. The process execution apparatus includes a calculation unit configured to execute the executable file, and a storage unit configured to store the application file and the license file. The method includes a step of decrypting the application encryption data by use of the application decryption key with the calculation unit based on the level of priority of the predesignated application encryption data stored in the storage unit, and installing the executable file corresponding to the application encryption data.

12 Claims, 10 Drawing Sheets

| License encryption data | Decryption key | Application encryption data | Priority level | Display language | Encryption strength |
|---|---|---|---|---|---|
| lic-secure-ver1 | /license/key1 | application-secure-ver1 | 2 | High speed installation | Medium |
| lic-secure-ver2 | /license/key2 | application-secure-ver2 | 1 | Secure installation | High |

FIG. 6

| License encryption data | Decryption key | Application encryption data | Priority level | Display language | Encryption strength |
|---|---|---|---|---|---|
| lic-secure-ver1 | /license/key1 | application-secure-ver1 | 2 | High speed installation | Medium |
| lic-secure-ver2 | /license/key2 | application-secure-ver2 | 1 | Secure installation | High |

APPLICATION INSTALLING METHOD

This application is a division of application Ser. No. 13/078,561, filed Apr. 1, 2011.

BACKGROUND OF THE INVENTION

1. Field of the Invention

The present invention relates to a method for installing an application.

2. Description of the Related Art

Conventionally, a method is known in relation to authorized use of a license or protection of internal information, or the like in which persons other than an authorized user cannot use an application installed on a process execution apparatus such as an image forming apparatus, or the like, or an information processing apparatus such as a computer, or the like. In this regard, a method and an information processing apparatus disclosed in Japanese Patent Laid-Open No. 10-301773 prevents unauthorized use of an application by encrypting the application program itself, and permission for decrypting is only granted to authorized software development personnel.

However, the technique disclosed in Japanese Patent Laid-Open No. 10-301773 does not consider a method adapted in relation to a change to the encryption algorithm. Generally, when a user changes an encryption algorithm, it is necessary to change both the encrypted application itself and the decryption application that receives and decrypts the encrypted application. Therefore, for example, when software development personnel change an encryption algorithm, all related components of the system must be reconfigured when applications that use the encryption algorithm are distributed on storage media such as optical disks. Furthermore, a determination must be made in relation to which application that has used the encryption algorithm must be distributed depending on the encryption key in a decryption application used by the user. In this context, although development personnel have proposed updating of the decryption application to coincide with an application to be distributed, this configuration is associated with difficulties due to the need to also update firmware used in the image forming apparatus, or the like. In addition, a method of automatic determination of an application to be distributed that coincides with the version of the firmware at the time of shipping from the factory has been proposed. However, automatic determination is difficult since the version of the firmware may be updated after market entry.

SUMMARY OF THE INVENTION

The present invention provides an installing method that enables installation of an application by suitable decryption of application encryption data in an application file in a process execution apparatus.

According to an aspect of the present invention, an application installing method that uses an application file and a license file based on an installation request from an information processing apparatus in a network system, and installs an executable file in a process execution apparatus, the network system including the process execution apparatus configured to execute processing of the executable file contained in the application, and the information processing apparatus configured to communicate with the process execution apparatus through a communication circuit; the application file includes at least two application encrypting data in which the executable files are respectively encrypted using different encryption algorithms; the license file includes at least two license encryption data in which application decryption keys for decrypting the application encryption data are encrypted using respectively different encryption algorithms; the process execution apparatus includes a calculation unit configured to execute the executable file, and a storage unit configured to store the application file and the license file, wherein the method includes a step of: decrypting the application encryption data by use of the application decryption key with the calculation unit based on the level of priority of the pre-designated application encryption data stored in the storage unit, and installing the executable file corresponding to the application encryption data.

According to the present invention, suitable installation of an application is possible by suitable decryption of application decryption data in the application file in the process execution apparatus.

Further features of the present invention will become apparent from the following description of embodiments with reference to the attached drawings.

BRIEF DESCRIPTION OF THE DRAWINGS

FIG. 6 is a table illustrating a license mapping table.

DESCRIPTION OF THE EMBODIMENTS

Various embodiments, features, and aspects of the invention will be described in detail below with reference to the drawings.

First Embodiment

Figure 1:
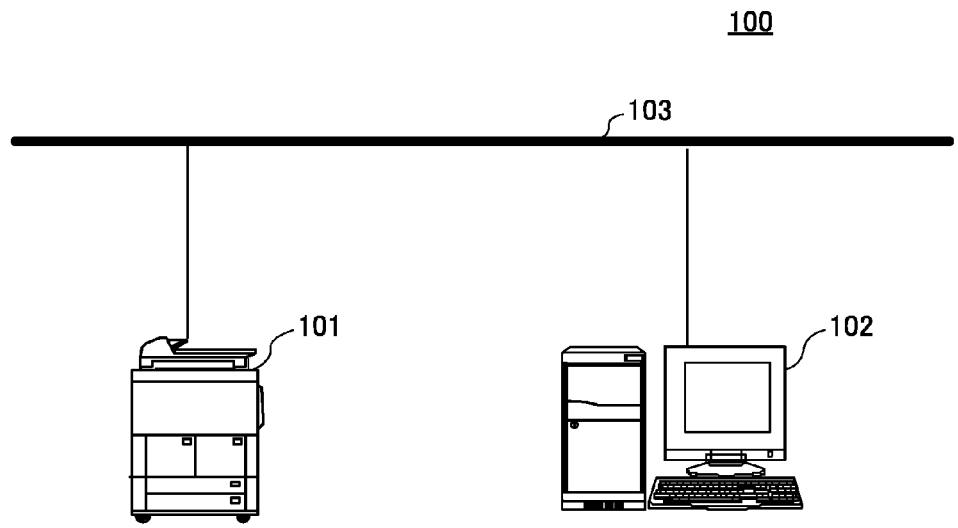
FIG. 1 is a schematic view of the configuration of a network system according to a first embodiment of the present invention.

Firstly, the configuration of the network system that applies the application installing method according to the present invention will be described. This network system includes an image forming apparatus that is provided as the process execution apparatus that executes the executable files contained in the application. FIG. 1 is a schematic view of the configuration of the network system. The network system 100 includes an image forming apparatus 101, and an information processing apparatus 102. Both the apparatuses 101 and 102 are connected to communicate through a communication circuit 103 such as a local area network (LAN), or the like. The process execution apparatus 102 may use hypertext transfer protocol (HTTP) to access the image transfer apparatus 101, and therefore the communication circuit 103 may be formed as a wide area network (WAN) or by the Internet.

Figure 2:
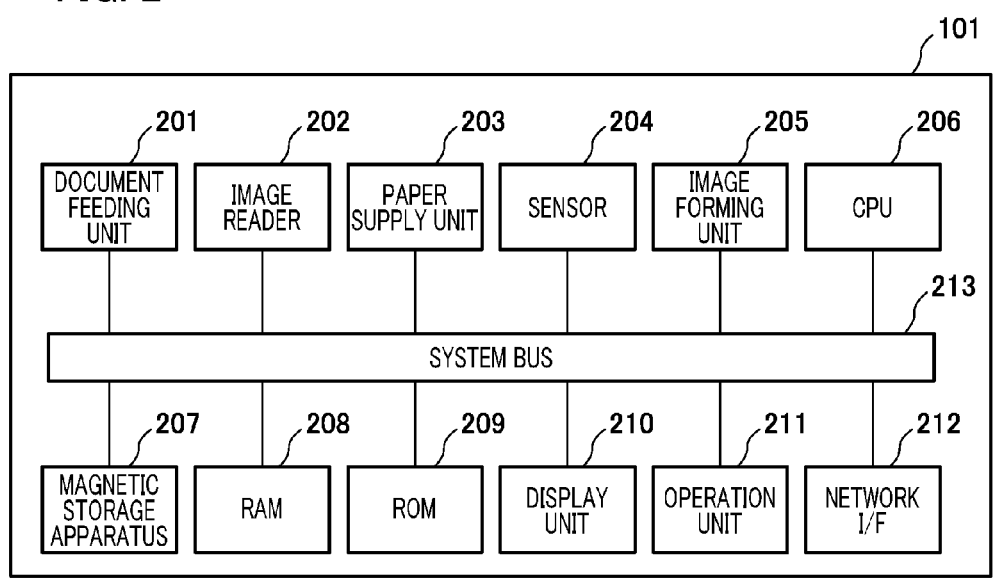
FIG. 2 is a block diagram of the configuration of an image forming apparatus according to the first embodiment of the present invention.

FIG. 2 is a block diagram of the configuration of an image forming apparatus 101. The image forming apparatus 101 is a multifunction apparatus including at least one function selected from functions including the printing, copying, reading, transmitting, or displaying of image data. The image forming apparatus 101 includes a document feeding unit 201 as a mechanism for executing insertion of a document or the like, an image reader 202, a paper supply unit 203, and a sensor 204. The document feeding unit 201 is a feeding unit configured to automatically send an inserted document to the image reader 202. The image reader 202 is a reading unit (scanner) configured to read the document, and converts the document to data. The paper supply unit 203 is a paper supply unit configured to supply paper for printing. The sensor 204 is a detection unit configured to detect the operational state of each constituent element in the image forming apparatus 101. The image forming apparatus 101 includes an image forming unit 205 as an image processing unit, a central processing unit (CPU) 206, a magnetic storage apparatus 207, a random access memory (RAM) 208, and a read only memory (ROM) 209. The image forming apparatus 205 is an image forming unit configured to convert the document data that has been read and the document data that has been received from an external unit to a printing image, and executes printing. The CPU 206 is a calculation unit configured to execute processing for each constituent element in the apparatus. The magnetic storage apparatus 207 is a storage unit configured to store various types of data and programs and the like, and is configured by a magnetic storage medium such as a hard disk. The RAM 208 is a rewritable memory that executes temporary electrical storage of data related to processing of each constituent element in the image forming apparatus 101. The ROM 209 is a readable memory that permanently retains data related to processing of each constituent element in the apparatus. The image forming apparatus 101 further includes a display unit 210 as an interface with the external environment, and an operation unit 211, and a Network I/F 212. The display unit 210 is a display unit that is configured by a liquid crystal display apparatus or the like, and is configured to display information related to the operation of the operation unit 211 and the operating state in the apparatus. The operation unit 211 is an operation unit that is configured by a keyboard or the like, and is configured to input commands to the apparatus. The Network I/F 212 is an interface that is connected to a LAN or the Internet through the communication circuit 103, and executes exchange of information with external units. The various constituent elements in the image forming apparatus 101 are respectively connected to a system bus 213, and execute operations in relation to various types of data.

Figure 3:
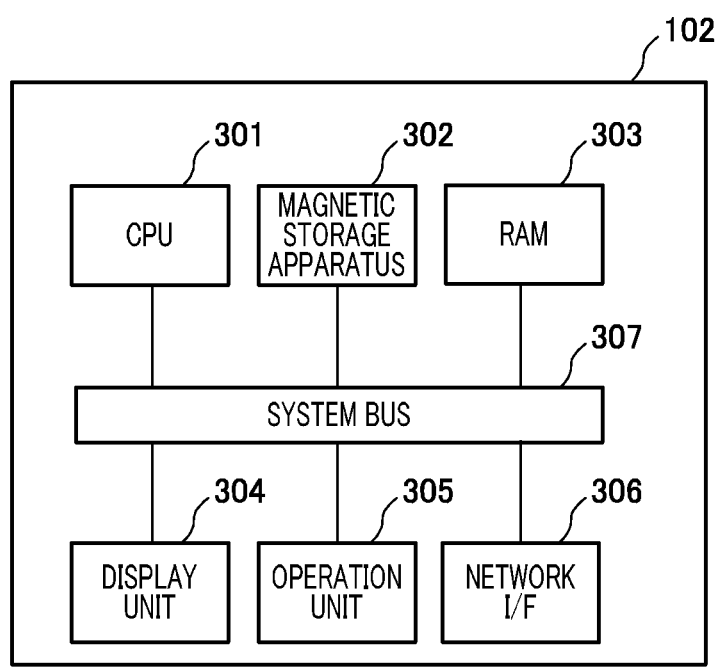
FIG. 3 is a block diagram of the configuration of an information processing apparatus according to the first embodiment of the present invention.

FIG. 3 is a block diagram of the configuration of an information processing apparatus 102. The information processing apparatus 102 is a computer that commands processing or provision of data in relation to the image forming apparatus 101, and that executes information exchange with external units through the communication circuit 103. The information processing apparatus 102 basically includes a CPU 301 that configures a main unit, a magnetic storage apparatus 302 and a RAM 303. The CPU 301 is a calculation unit configured to execute calculation processing. The magnetic storage apparatus 302 is a storage unit configured to store various types of data or programs, or the like, and is configured by a magnetic storage medium such as a hard disk, or the like. The RAM 303 is a rewritable memory and executes temporary electrical storage of data related to calculation processing. The information processing apparatus 102 further includes a display unit 304, and an operation unit 305, and Network I/F 306. The display unit 304 is a display unit that is configured by a liquid crystal display apparatus or the like, and is configured to display user interface information such as windows, icons, messages, menus, and the like. The operation unit 305 is an operation unit that is configured by a keyboard, a mouse or the like, and is configured to input commands to the apparatus. The Network I/F 306 is connected to a LAN or the Internet through the communication circuit 103, and executes exchange of information with external units. The various constituent elements in the information processing apparatus 102 are respectively connected to a system bus 307, and execute operations in relation to various types of data.

Figure 4:
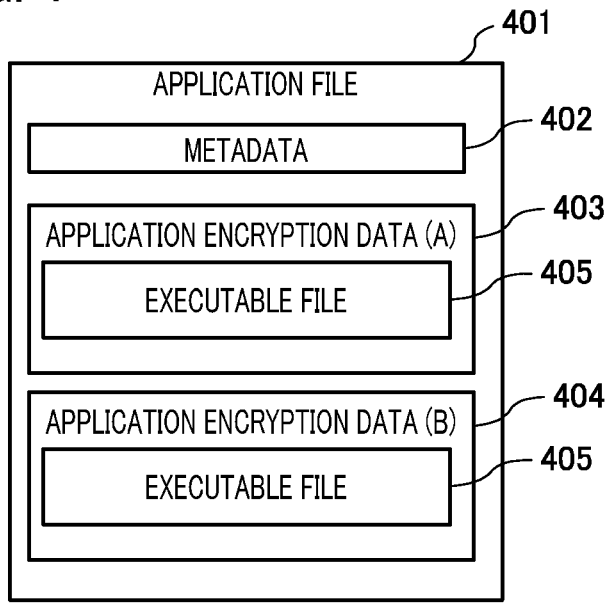
FIG. 4 is a schematic figure illustrating the format of an application file.

Next, an example of a display screen during installation, tabling, and formatting of various types of files used in the image forming apparatus 101 will be described. Firstly, the format of an application file that is installed in the image forming apparatus 101 will be described. FIG. 4 is a schematic figure illustrating the format of an application file. The application file 401 includes entries such as metadata 402, and at least one application encryption data. In this configuration, the application file 401 is configured by inclusion of two application encryption data sets such as application encryption data (A) 403 and application encryption data (B) 404. The registered entry name of the application encryption data (A) 403 is "application-secure-ver1", and the application encryption data (B) 404 is "application-secure-ver2". As used herein, the metadata 402 are data that define the meta-information of the application file 401. The application encryption data (A) 403 and application encryption data (B) 404 are data that encrypt the executable file 405. In this case, the application encryption data (A) 403 and application encryption data (B) 404 encrypt the executable file 405 using respectively different encryption algorithms. The executable file 405 is an application that is operated on the image forming apparatus 101, and is the same in both the application encryption data (A) 403 and application encryption data (B) 404. The file type of the application file 401 may be a container format, and in the present embodiment, in the following description, the format is a ZIP format.

Figure 5:
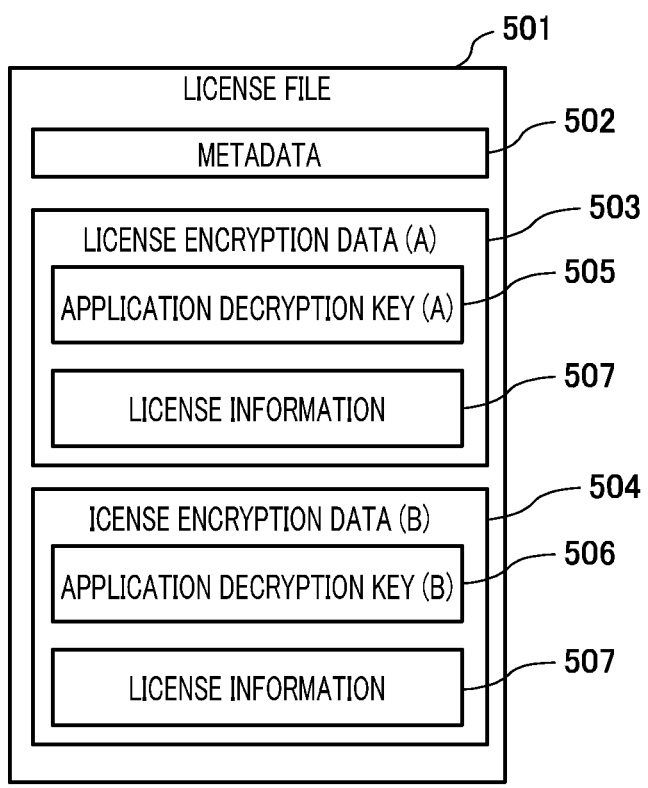
FIG. 5 is a schematic figure illustrating the format of a license file.

Next, the format of the license file required for installation of the application file 401 in the image forming apparatus 101 will be described. FIG. 5 is a schematic figure illustrating the format of the license file. The license file 501 includes metadata 502 and at least one license encryption data. The metadata 502 are data that define the meta information of the license file 501. The license encryption data (A) 503 and (B) 504 are data in which the application decryption keys (A) 505, (B) 506, and the license information 507 are encrypted using respectively different encryption algorithms. The application decryption keys (A) 505, (B) 506 are keys for respective decryption of the application encryption data (A) 403, (B) 404. The license information 507 is data that retain information for determination of whether or not to install the application file 401, or information related to the period or validity or the like. The license information 507 is the same in both the license encryption data (A) 503, (B) 504. The format of the license file 501 is described as text format in the present embodiment, but may be a container format in the same manner as the application file 401.

Next, the license mapping table that expresses the relationships between the various encryption data will be described.

FIG. 6 is a table illustrating a license mapping table that is retained in a magnetic storage apparatus 207 in the image forming apparatus 101. The application mapping table 601 includes a license encryption data column 602, a decryption key column 603, an application encryption data column 604, a priority level column 605, a display language column 606, and an encryption strength column 607. The license encryption data column 602 is the column that saves the name of the license encryption data saved in the license file 501. The decryption key column 603 is the column that saves the path in the magnetic storage apparatus 207 for storing the decryption keys for decryption of the license encryption data (A) 503, (B) 504. The application encryption data column 604 is the column that saves the entry name of the application encryption data (A) 403, (B) 404. The priority level column 605 is the column that saves the level of priority of a record, and is used when there are at least two records in the license mapping table 601 that are useable during installation. The display language column 606 is the column that saves the language displayed when there are at least two records in the license mapping table 601 that are useable during installation, and the license mapping table 601 is selected by the user. The encryption strength column 607 is the column that saves the encryption strength displayed when there are at least two records in the license mapping table 601 that are useable during installation, and the license mapping table 601 is selected by the user. The data for the security strength is relative to each record.

Figure 7:
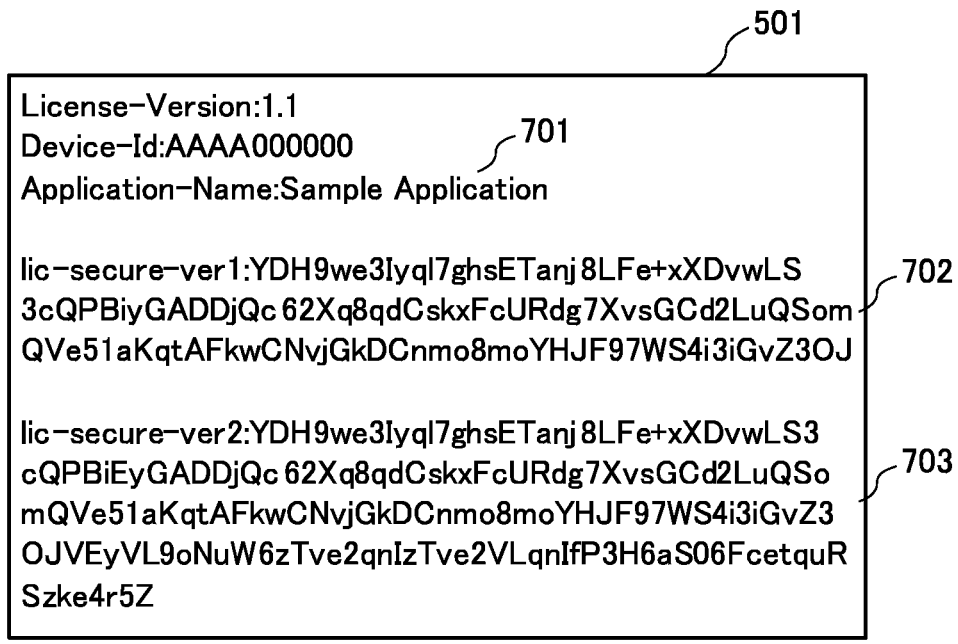
FIG. 7 illustrates the description details for the license file.

Next, the description details of the license file 501 will be described. FIG. 7 illustrates the description details displayed when the license file 501 is opened using a text editor. In this case, the license file 501 includes a metadata unit 701 and two license encryption data units 702, 703, and are respectively described in the format "key:value". The metadata unit 701 is the field that describes the metadata 502. The license encryption data units 702, 703 are the respective fields that describe the license encryption data (A) 503, (B) 505. FIG. 7 illustrates the two keys "lic-secure-ver1" and "lic-secure-ver2" used as the license encryption data units 702 and 703.

Figure 8:
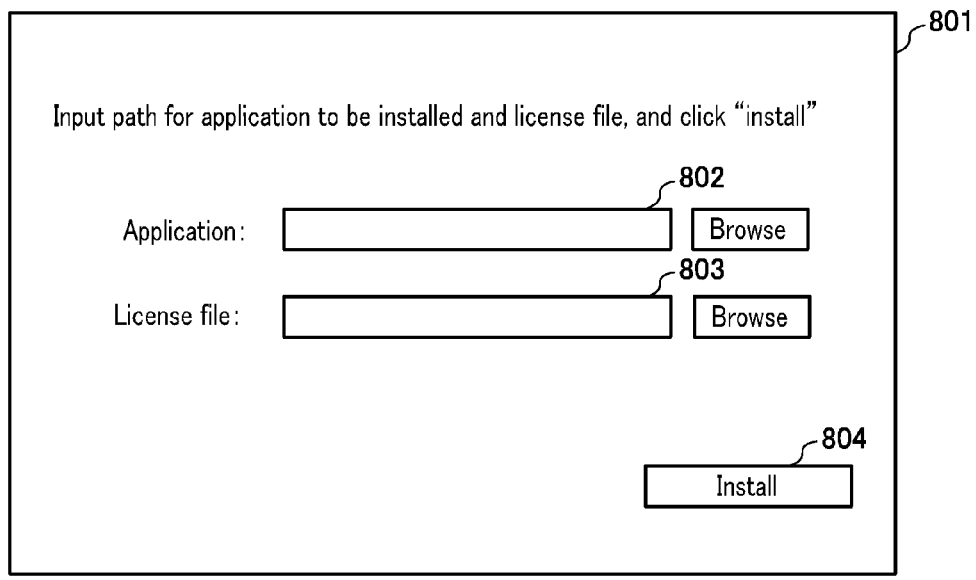
FIG. 8 illustrates a display screen during application installation.

Next, the display screen during application installation will be described. Firstly, FIG. 8 illustrates an example of an installation screen that is displayed during installation of an application. The installation screen 801 is a screen that is described in HTML format, and that displays the response of the image forming apparatus 101 on the display unit 304 in the information processing apparatus 102 based on a display request from the information processing apparatus 102. The installation screen 801 includes an application text field 802, a license text field 803, and an installation button 804. The application text field 802 is a text field that designates the path for the application field 401 on the magnetic storage apparatus 302 in the information processing apparatus 102. The license text field 803 is a text field that designates the path for the license field 501 on the magnetic storage apparatus 302 in the information processing apparatus 102. The installation button 804 is a button that commands installation to the image forming apparatus 101, and forwards a file designated by the application text field 802 and the license text field 803.

Figure 9:
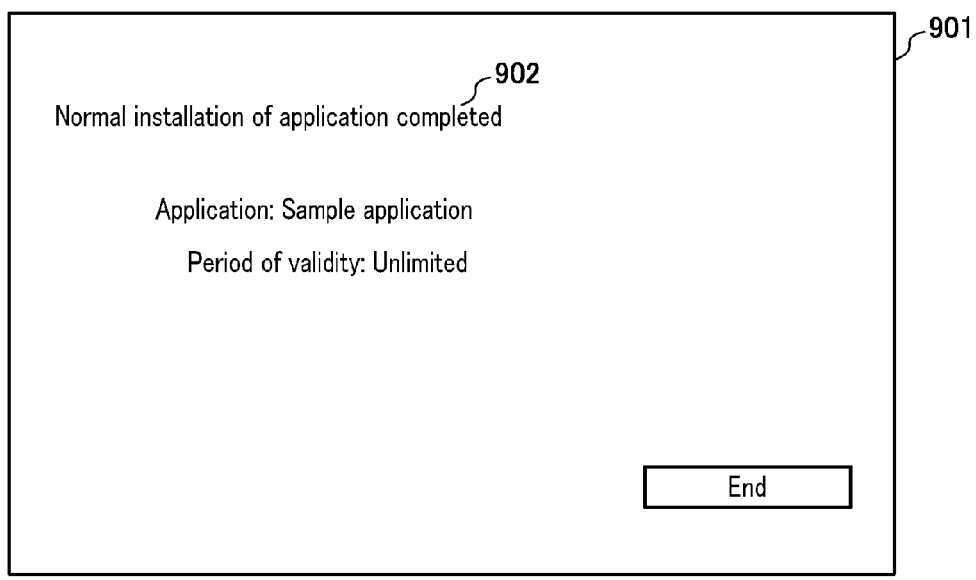
FIG. 9 illustrates a results display screen for display of an installation result.

FIG. 9 illustrates an example of a results display screen for display of an installation result after completion of installation of the application. The results screen 901 is a screen that is described in HTML format, and displays the response of the image forming apparatus 101 on the display unit 304 in the information processing apparatus 102 based on a display request from the information processing apparatus 102. The results screen 901 includes an installation result label 902 that displays an installation result.

Figure 10:
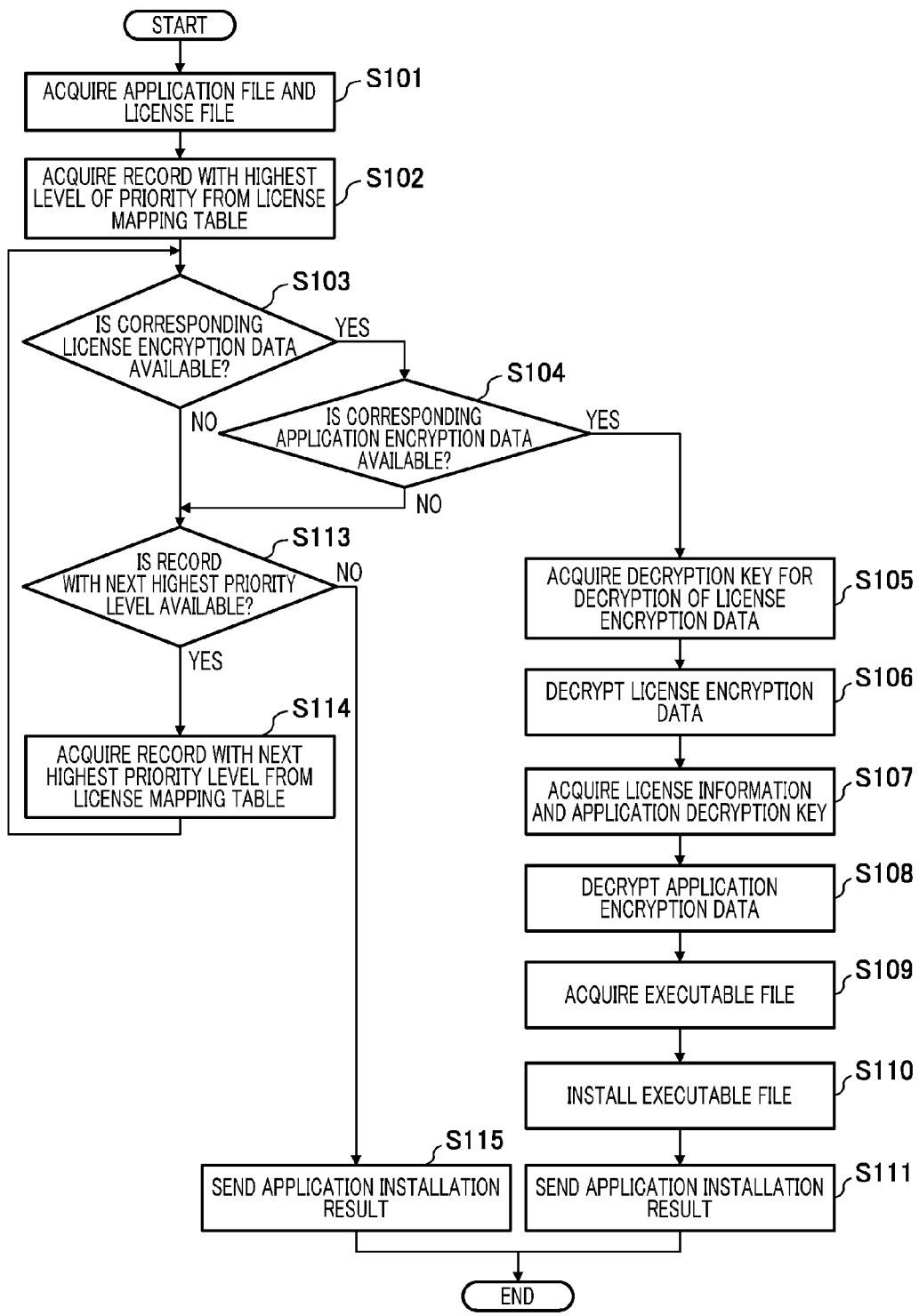
FIG. 10 is a flowchart that illustrates an installation step according to the first embodiment.

The installing method for an application according to the first embodiment will be described using a flowchart. FIG. 10 is a flowchart that illustrates an installation step according to the present embodiment. The installation step is executed when an application installation request is received by the image forming apparatus 101 via the communication circuit 103. The installation request is executed by clicking the installation button 804 in the application installation screen 801 displayed on the display unit 304 by user operation of the operation unit 305 of the information processing apparatus 102.

Firstly, the CPU 206 of the image forming apparatus 101 acquires respectively one type of application file 401 and license file 501 based on the installation request from the information processing apparatus 102 (step S101: file acquisition step). Next, the CPU 206 acquires a record in which the priority level column 605 of the license mapping table 601 stored in the magnetic storage apparatus 207 has a value of "1", that is to say, has the highest level of priority (step S102: record acquisition step). Next, the CPU 206 acquires the value of the license encryption data column 602 from the acquired record. The CPU 206 determines whether or not the value is present as license encryption data (A) 503, ((B) 504) for the license file 501 acquired in step S101 (step S103: license encryption data determination step). When it is determined that the value is present as license encryption data (A) 503, ((B) 504) for the license file 501 (YES), the CPU 206 acquires the value of the application encryption data column 604 from the acquired record. Then the CPU 206 determines whether or not the value is present as the application encryption data (A) 403, ((B) 404) for the application file 401 acquired in step S101 (step S104: application encryption data determination step). When the CPU 206 determines that the value is present as the application encryption data (A) 403, ((B) 404) (YES), the processing proceeds to step S105. Next, the CPU 206 uses the value set in the decryption key column 603 of the acquired record to acquire the decryption key stored in the magnetic storage apparatus 207 (step S105; decryption key acquisition step). Next, the CPU 206 uses the acquired decryption key to decrypt the license encryption data (A) 503, ((B) 504) detected in step S103 (step S106). Then the CPU 206 acquires the application decryption keys (A) 505 ((B) 506) and the license information 507 from the decrypted license encryption data (A) 503, ((B) 504) (step S107: license encryption data decryption step). For example, when the license encryption data detected in step S103 is license encryption data (A) 503, the CPU 206 acquires the application decryption key (A) 505 and the license information 507. Next, the CPU 206 uses the acquired application decryption keys (A) 505 ((B) 506) to decrypt the application decryption data (A) 403 ((B) 404) detected in step S104 (step S108: application decryption key acquisition step). Next, the CPU 206 acquires the executable file 405 from the application decrypted in step S108 (step S109: application decryption step). Next, the CPU 206 uses the executable file 405 acquired in step S109 and the license information 507 acquired in step S107 to execute installation of the executable file 405 (step S110: installation execution step). Next, the CPU 206 sends the installation result to the information processing apparatus 102 through the communication circuit 103. The display unit 304 of the information processing apparatus 102 displays HTML data set in the installation result label 902 using the form of the installation result screen 901 (step S111). Then, the CPU 206 ends the installation processing.

When the CPU 206 determines that the corresponding values in step S103 and step S104 are not present as data (NO), the CPU 206 determines whether or not there is a record having the next highest level of priority in the priority level column 605 (step S113). When the CPU 206 determines that there is a record having the next highest level of priority (YES), a value of "2" in the priority level column 605, that is to say, the record with the next highest level of priority is acquired, and the processing returns again to step S103 (step S114). On the other hand, when the CPU 206 determines that there is no record having the next highest level of priority (NO), the installation result is sent to the information processing apparatus 102 through the communication circuit 103 (step S115). In this case, the display unit 304 of the information processing apparatus 102 displays an installation failure message in the formatting of the installation result screen 901 as HTML data set in the installation result label 902. Then, the CPU 206 ends the installation processing.

As described above, the installing method for an application according to the present embodiment includes at least two records in a license mapping table 601 in the image forming apparatus 101, and executes installation by determining an assigned priority level to an applicable encryption algorithm. Therefore, respectively one type of application file 401 and license file 501 is sufficient even when the image forming apparatus 101 supports a plurality of encryption algorithms having different levels of security strength. In this manner, provision of a storage medium such as an optical disk or the like for each encryption algorithm can be omitted, and there is no requirement for individual determination of the applications to be distributed. Furthermore, a high priority setting for the record of an encryption algorithms that has a high security strength enables installation with an encryption algorithm that has a high security strength without installation of an application for only the old encryption algorithm.

Second Embodiment

Next, the installing method for an application according to a second embodiment of the present invention will be described. In the installing method according to the first embodiment, the CPU 206 determines the automatically used encryption algorithm based on the level of priority defined in the license mapping table 601. However, the CPU 206 and the RAM 208 that configure the image forming apparatus 101 are not high performance components when compared to a general computer (personal computer), and therefore the decryption processing may take some time. In particular, when a high-level encryption algorithm or a long key is used, the required time may conspicuously increase. In this context, the present embodiment is characterized in that an encryption algorithm that is used when preinstalled by a user is selected, and the CPU 206 executes installation based on the selected encryption algorithm.

Figure 11:
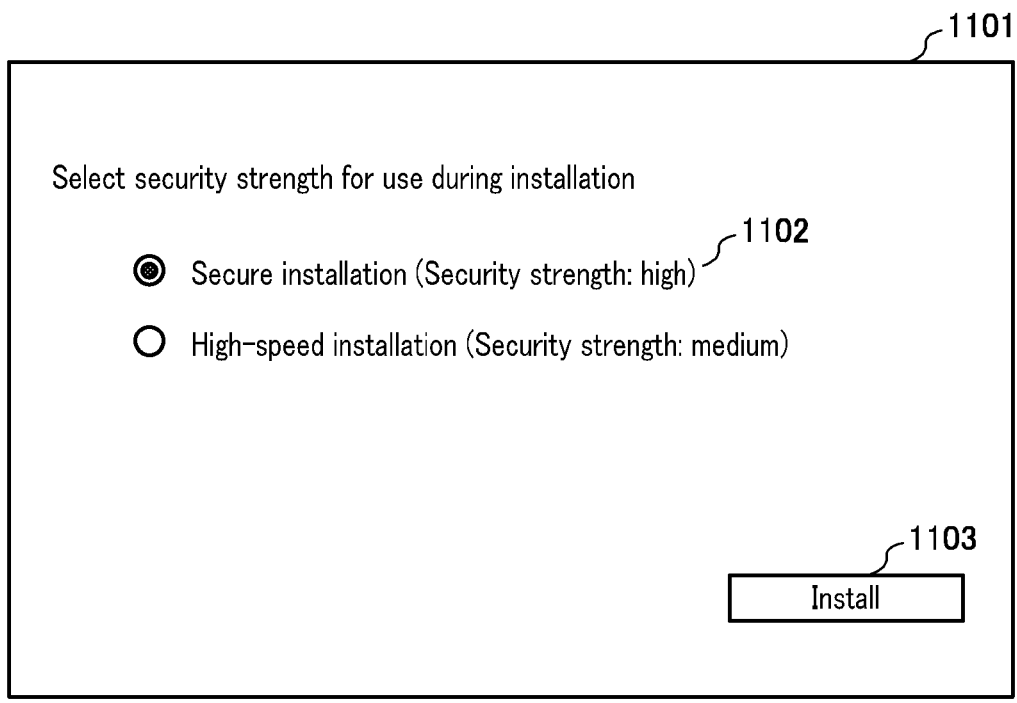
FIG. 11 illustrates an encryption algorithm selection screen.

Firstly, the algorithm selection screen for selection of the encryption algorithm will be described. FIG. 11 illustrates an example of an encryption algorithm selection screen. The encryption algorithm selection screen 1101 is a screen described in HTML format, and is a screen that is displayed on the display unit 304 in the information processing apparatus 102 before starting installation of the application in the image forming apparatus 101. The algorithm selection screen 1101 includes a security strength wireless button 1102 and an installation button 1103. The security strength wireless button 1102 is a wireless button for allowing a user to select the security strength used during installation. The installation button 1103 is a button for commanding the selected installation in relation to the image forming apparatus 101, and for sending information for the selected security strength wireless button 1102. The display features for the security strength wireless button 1102 displayed by the CPU 206 include the record value that is present in the selectable encryption algorithm stored in the RAM 208. For example, the display language column 606 and the encryption strength column 607 in the record may be used for a default check of the value in the priority level column 605 that has the highest value.

Figure 12:
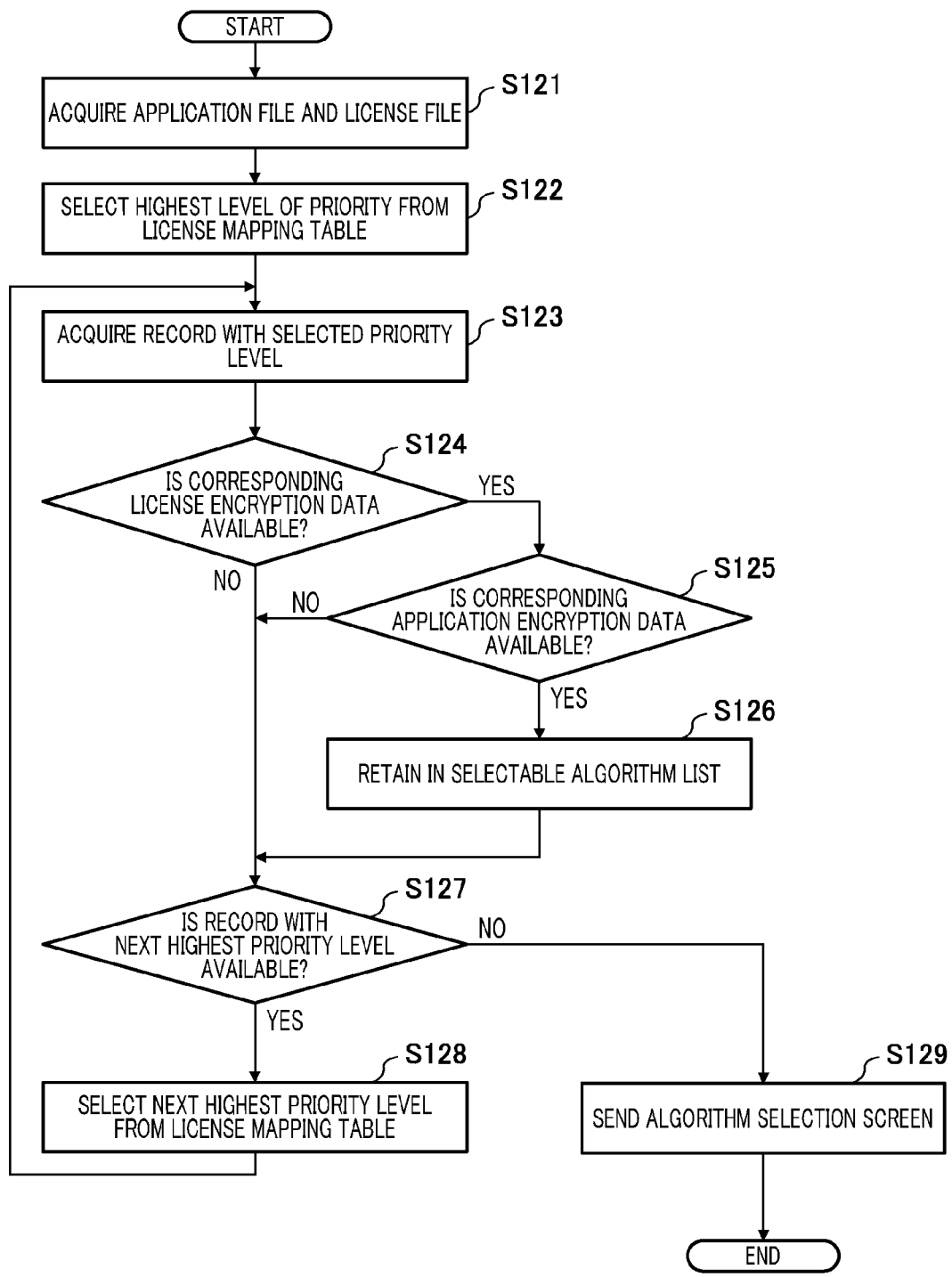
FIG. 12 is a flowchart that illustrates a preparation step for the encryption algorithm selection screen.
Figure 13:
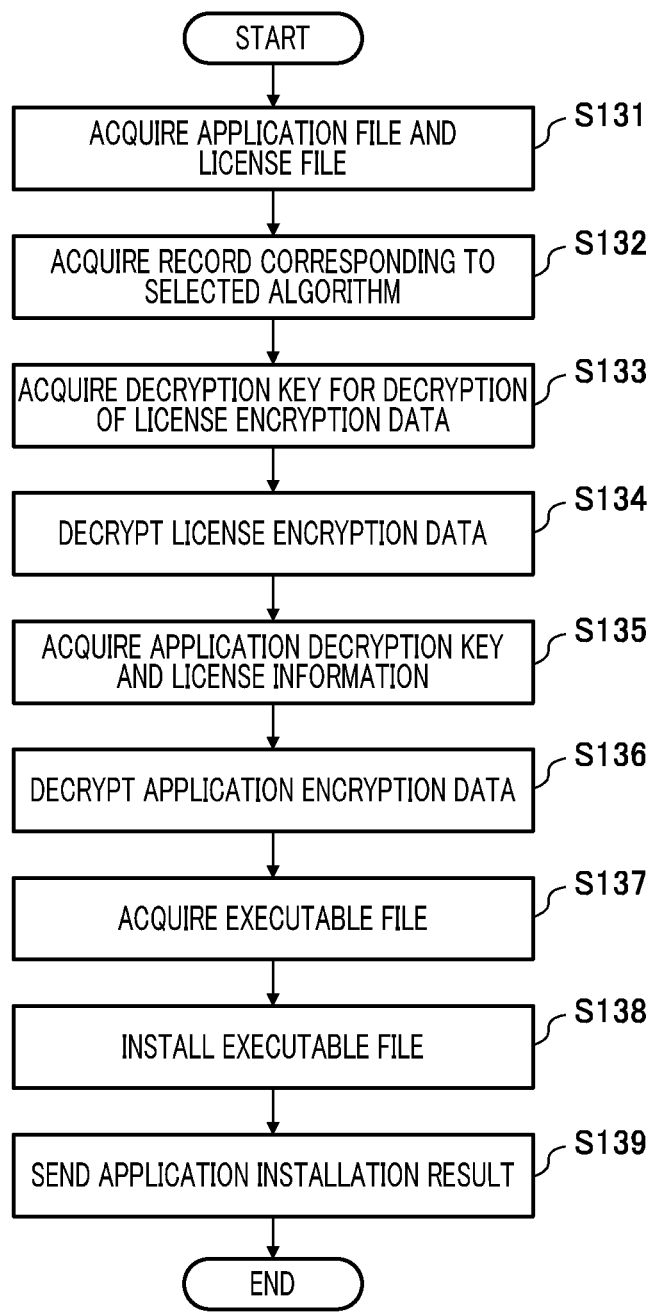
FIG. 13 is a flowchart that illustrates an installation step according to a second embodiment.

Next, a flowchart will be described in relation to the installing method for an application according to the second embodiment. FIG. 12 and FIG. 13 are flowcharts that illustrate the installation process according to the present embodiment. The image preparation step for preparation of an algorithm selection screen 1101 and the installation step executed by the selected encryption algorithm will be described separately.

FIG. 12 is a flowchart that illustrates a screen preparation step for preparation of the algorithm selection screen 1101. The screen preparation step is executed upon receipt of an application installation request by the image forming apparatus through the communication circuit 103. The installation request is executed when a user clicks the installation button 804 on the application installation screen 801 displayed on the display unit 304 by operation of the operation unit 305 of the information processing apparatus 102. Firstly, the CPU 206 of the image forming apparatus 101 acquires respective one type of application file 401 and license file 501 based on the installation request received from the information processing apparatus 102 (step S121). The acquired application file 401 and the license file 501 are stored in the magnetic storage apparatus 207 that is assigned with a session ID to enable use also in the installation step illustrated in FIG. 13 as described below that represents a different request to the current installation request. Next, the CPU 206 selects a value in the priority level column 605 of the license mapping table 601 stored in the magnetic storage apparatus 207 has a value of "1", that is to say, the value that has the highest level of priority (step S122). Next, the CPU 206 acquires the record including the selected level of priority (step S123). Next, the CPU 206 acquires the value of the license encryption data column 602 from the acquired record. The CPU 206 determines whether or not the value is present as license encryption data (A) 503, ((B) 504) for the license file 501 acquired in step S121 (step S124). When it is determined that the value functions as license encryption data (A) 503, ((B) 504) for the license file 501 (YES), the CPU 206 acquires the value of the application encryption data column 604 from the acquired record. Then the CPU 206 determines whether or not the value is present as application encryption data (A) 403, ((B) 404) for the application file 401 acquired in step S121 (step S125). When it is determined that the value is present as application encryption data (A) 403, ((B) 404) (YES), the processing proceeds to step S126. Next, the CPU 206 stores the record acquired in step S123 in the RAM 208 as a selectable algorithm (step S126: algorithm list preparation step). Next, the CPU 206 determines whether or not there is a record having the next highest level of priority in the priority level column 605 (step S127). The same processing is also executed when the CPU 206 determines that the values corresponding to the step S124 and step S125 are not present as data (NO). When the CPU 206 determines that there is a record having the next highest level of priority (YES), a value of "2" in the priority level column 605, that is to say, the record with the next highest level of priority is acquired, and the processing returns again to step S123 (step S128). On the other hand, when the CPU 206 determines that there is no record having the next highest level of priority (NO), the algorithm selection screen 1101 is set and sent to the information processing apparatus 102 through the communication circuit 103 (step S129: selection screen setting step). Then, the CPU 206 ends the installation processing.

FIG. 13 is a flowchart that illustrates an installation step when installing an application by selection of an encryption algorithm. The installation step is executed when an installation request that selects an encryption algorithm is received by the image forming apparatus 101 through the communication circuit 103. The installation request at this time is executed by a user clicking the installation button 1103 in the algorithm selection screen 1101 displayed on the display unit 304 by operation of the operation unit 305 of the information processing apparatus 102. Firstly, the CPU 206 of the image forming apparatus 101 re-acquires the application file 401 and license file 501 acquired in the step S121 in FIG. 12 from the magnetic storage apparatus 207 (step S131). Next, the CPU 206 acquires a record that corresponds to the selected encryption algorithm from the license mapping table 601 (step S132). Next, the CPU 206 acquires the decryption keys stored in the magnetic storage apparatus 207 by use of the value set in the decryption key column 603 of the acquired record (step S133). Then the CPU 206 uses the decryption keys to decrypt the license encryption data (A) 503, ((B) 504) in the license file 501 acquired in step S131 (step S134). Next, the CPU 206 acquires the license information 507 and the application encryption keys (A) 506, ((B) 506) from the decrypted license encryption data (A) 503, ((B) 504) (step S135). Then, the CPU 206 uses the acquired application decryption keys (A) 505, ((B) 505) to decrypt the application encryption data (A) 403, ((B) 404) acquired in step S131 (step S136). Then, the CPU 206 acquires the executable file 405 decrypted in step S136 (step S137). Then, the CPU 206 uses the license information 507 acquired in step S135 and the executable file 405 acquired in step S137 to execute installation of the executable file 405 (step S138). The CPU 206 sends the installation result through the communication circuit 103 to the information processing apparatus 102, and the display unit 304 of the information processing apparatus 102 displays the HTML data set in the installation result label 902 in the formatting of the installation result screen 901 (step S139). Then, the CPU 206 ends the installation processing (step S112).

According to the present embodiment, since installation is executed by use of an encryption algorithm that is preselected by a user, installation of an application and license through a safe input path can be executed more promptly.

While the embodiments of the present invention have been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2010-106259 filed May 6, 2010 which are hereby incorporated by reference herein in its entirety.

What is claimed is:

1. A processing apparatus, comprising:
    a first receiving unit that receives, from an external device, an application file that includes both a first executable file and a second executable file that is encrypted using encryption algorithms that has a higher security strength than that of the first executable file, wherein the first executable file and the second executable file are executable files that are encrypted using encryption algorithms having different security strength;
    a second receiving unit that receives, from an external device, a license file that includes both a first decryption key and a second decryption key that is encrypted using encryption algorithms that has a higher security strength than that of the first decryption key and decrypts the second executable file, wherein the first decryption key and the second decryption key are a plurality of decryption keys that are encrypted using encryption algorithms having different security strengths;
    an acquisition unit that acquires one of the decryption keys that is required for decrypting a decryption key for decrypting the executable files according to an encryption algorithm that is set in advance before starting an installation of the application file; and
    a decrypting unit that acquires the decryption key for decrypting the executable files by decrypting any one of the first decryption key and the second decryption key using the decryption key acquired by the acquisition unit and decrypts the executable files for decrypting using the decryption key for decrypting the executable files.

2. The processing apparatus according to claim 1, further comprising:
    a providing unit that provides an encryption algorithm selection screen for displaying a security strength relative to each of the encryption algorithms for selecting to the external device, wherein the encryption algorithm selection screen is a screen for selecting the encryption algorithm, and
    wherein the encryption algorithm that is set in advance before starting an installation of the application file is the encryption algorithm that is selected on the encryption algorithm selection screen.

3. The processing apparatus according to claim 2, wherein an encryption algorithm of the highest priority level is selected by default on the encryption algorithm selection screen provided by the providing unit.

4. The processing apparatus according to claim 3, wherein the plurality of decryption keys for decrypting the executable files are stored, and the plurality of decryption keys are given a priority level and managed.

5. A method executed by a processing apparatus, comprising:
    a first receiving step of receiving, from an external device, an application file that includes both a first executable file and a second executable file that is encrypted using encryption algorithms that has a higher security strength than that of the first executable file, wherein the first executable file and the second executable file are executable files that are encrypted using encryption algorithms having different security strength;
    a second receiving step of receiving, from an external device, a license file that includes both a first decryption key and a second decryption key that is encrypted using encryption algorithms that has a higher security strength than that of the first decryption key and decrypts the second executable file, wherein the first decryption key and the second decryption key are a plurality of decryption keys that are encrypted using encryption algorithms having different security strengths;
    an acquisition step of acquiring one of the decryption keys that is required for decrypting a decryption key for decrypting the executable files according to an encryption algorithm that is set in advance before starting an installation of the application file; and
    a decrypting step of acquiring the decryption key for decrypting the executable files by decrypting any one of the first decryption key and the second decryption key using the decryption key acquired by the acquisition step and decrypting the executable files for decrypting using the decryption key for decrypting the executable files.

6. The method according to claim 5, further comprising:
- a providing step of providing an encryption algorithm selection screen for displaying a security strength relative to each of the encryption algorithms for selecting to the external device, wherein the encryption algorithm selection screen is a screen for selecting the encryption algorithm, and
- wherein the encryption algorithm that is set in advance before starting an installation of the application file is the encryption algorithm that is selected on the encryption algorithm selection screen.

7. The method according to claim 5, wherein an encryption algorithm of the highest priority level is selected by default on the encryption algorithm selection screen provided by the providing step.

8. The method according to claim 7, wherein the plurality of decryption keys for decrypting the executable files are stored, and the plurality of decryption keys are given a priority level and managed.

9. A non-transitory computer readable storage medium on which is stored computer executable code of a program that, when executed by a processing apparatus, causes the processing apparatus to perform a process comprising:
- a first receiving step of receiving, from an external device, an application file that includes both a first executable file and a second executable file that is encrypted using encryption algorithms that has a higher security strength than that of the first executable file, wherein the first executable file and the second executable file are executable files that are encrypted using encryption algorithms having different security strength;
- a second receiving step of receiving, from an external device, a license file that includes both a first decryption key and a second decryption key, that is encrypted using encryption algorithms that has a higher security strength than that of the first decryption key and decrypts the second executable file, wherein the first decryption key and the second decryption key are a plurality of decryption keys that are encrypted using encryption algorithms having different security strengths;
- an acquisition step of acquiring one of the decryption keys that is required for decrypting a decryption key for decrypting the executable files according to an encryption algorithm that is set in advance before starting an installation of the application file; and
- a decrypting step of acquiring the decryption key for decrypting the executable files by decrypting any one of the first decryption key and the second decryption key using the decryption key acquired by the acquisition step and decrypting the executable files for decrypting using the decryption key for decrypting the executable files.

10. The non-transitory computer readable storage medium according to claim 9, further comprising:
- a providing step of providing an encryption algorithm selection screen for displaying a security strength relative to each of the encryption algorithms for selecting to the external device, wherein the encryption algorithm selection screen is a screen for selecting the encryption algorithm, and
- wherein the encryption algorithm that is set in advance before starting an installation of the application file is the encryption algorithm that is selected on the encryption algorithm selection screen.

11. The non-transitory computer readable storage medium according to claim 10, wherein an encryption algorithm of the highest priority level is selected by default on the encryption algorithm selection screen provided by the providing step.

12. The non-transitory computer readable storage medium according to claim 11, wherein the plurality of decryption keys for decrypting the executable files are stored, and the plurality of decryption keys are given a priority level and managed.

* * * * *